(12) United States Patent
Maskaliunas (10) Patent No.: US 11,486,447 B2
(45) Date of Patent: Nov. 1, 2022

(54) DRY-LUBRICATING LEAD-IN EDGE FOR PRESS-FIT ASSEMBLIES AND ASSOCIATED METHODS

(71) Applicant: Consolidated Metco, Inc., Vancouver, WA (US)

(72) Inventor: Linas Maskaliunas, Vancouver, WA (US)

(73) Assignee: CONSOLIDATED METCO, INC., Vancouver, WA (US)

( * ) Notice: Subject to any disclaimer, the term of this patent is extended or adjusted under 35 U.S.C. 154(b) by 304 days.

(21) Appl. No.: 16/911,016

(22) Filed: Jun. 24, 2020

(65) Prior Publication Data
US 2020/0400194 A1    Dec. 24, 2020

Related U.S. Application Data

(60) Provisional application No. 62/865,606, filed on Jun. 24, 2019.

(51) Int. Cl.
| | |
|---|---|
| *F16C 43/04* | (2006.01) |
| *F16J 15/3268* | (2016.01) |
| *F16J 15/3276* | (2016.01) |
| *F16C 33/78* | (2006.01) |

(52) U.S. Cl.
CPC ......... *F16C 43/045* (2013.01); *F16C 33/783* (2013.01); *F16J 15/3268* (2013.01); *F16J 15/3276* (2013.01); *F16C 33/78* (2013.01)

(58) Field of Classification Search
CPC ...... F16C 43/045; F16C 33/78; F16C 33/783; F16C 2226/12; F16J 15/3268; F16J 15/3276
See application file for complete search history.

(56) References Cited

U.S. PATENT DOCUMENTS

| | | | |
|---|---|---|---|
| 2,827,303 A | 3/1958 | Herbenar | |
| 3,761,099 A | 9/1973 | Hansson | |
| 4,109,921 A * | 8/1978 | Urbaschek | F16J 15/32 277/587 |
| 4,907,811 A * | 3/1990 | Nash | F16J 15/3268 277/944 |
| 5,009,434 A * | 4/1991 | Nash | F16J 15/3268 303/146 |
| 5,577,741 A | 11/1996 | Sink | |

(Continued)

OTHER PUBLICATIONS

PCT/US2020/039378 International Search Report & Written Opinion dated Sep. 14, 2020, 11 pages.

(Continued)

*Primary Examiner* — Nicholas L Foster
(74) *Attorney, Agent, or Firm* — Lathrop GPM LLP (57) ABSTRACT

A dry-lubricating apparatus, for press fitting onto a mating part, includes (a) a frame, (b) a rubber gasket fixed to the frame to create an interference with a mating surface of the mating part so as to enable the press fitting, and (c) a lead-in edge fixed to at least one of the frame and the rubber gasket. The lead-in edge includes a dry lubricant such that, when the dry-lubricating apparatus is slid onto the mating part, along the mating surface and with the rubber gasket trailing the lead-in edge, a portion of the dry lubricant is abraded off the lead-in edge to reduce friction between the rubber gasket and the mating surface.

27 Claims, 8 Drawing Sheets

(56) References Cited

U.S. PATENT DOCUMENTS

| | | | |
|---|---|---|---|
| 6,543,786 B2 * | 4/2003 | Osumi | F16J 15/3228 277/346 |
| 10,655,735 B2 * | 5/2020 | Franz | F16J 15/322 |
| 2002/0003338 A1 * | 1/2002 | Osumi | F16J 15/3228 277/562 |
| 2005/0189725 A1 * | 9/2005 | Edwards | B32B 1/04 277/615 |
| 2005/0248096 A1 * | 11/2005 | Baudry | F16J 15/3276 277/559 |
| 2007/0163530 A1 * | 7/2007 | Luchs | F16J 15/3268 123/90.37 |
| 2010/0237567 A1 * | 9/2010 | Kurth | F16J 15/3244 277/559 |
| 2018/0299014 A1 * | 10/2018 | Franz | F16J 15/3244 |

OTHER PUBLICATIONS

Solid Lubricants (Tribology) Mar. 9, 2018; retrieved from the Internet on Aug. 25, 2020 https://web.archive.org/web/20180309161636/https://www.tribology-abc.com/abc/solidlub.htm, 4 pages.

Wax Lube (Finish Line) Feb. 4, 2016 retrieved from the Internet on Aug. 25, 2020 https://web.archive.org/web/20160304023343l/http://www.finishlineusa.com/products/chain-lubricants/wax-lube, 2 pages.

Hou, X et al.; Hydrophobicity study of polytetrafluoroethylene nanocomposite films Mar. 3, 2012, Thin Solid Films 520, pp. 4916-4920.

\* cited by examiner

DRY-LUBRICATING LEAD-IN EDGE FOR PRESS-FIT ASSEMBLIES AND ASSOCIATED METHODS

RELATED APPLICATION

This application claims priority to U.S. Provisional Patent Application No. 62/865,606, filed Jun. 24, 2019 and titled "Dry-Lubricating Lead-In Edge for Press-Fit Assemblies", which is incorporated herein by reference in its entirety.

BACKGROUND

Wheel bearings generally require a bearing seal that seals between the bearing and the external environment, to prevent contaminants from entering the bearing and to prevent or reduce loss of oil from the bearing. A part of the bearing seal is affixed to the rotating part of the wheel assembly (the hub), and another part of the bearing seal is affixed to the stationary part of the wheel assembly (the axle). A dynamic seal is formed between the rotating and stationary seal parts. The dynamic seal is, for example, a labyrinthine path between the rotating and stationary seal parts with an elastomer lip bridging the gap therebetween. The rotating seal part, the axle, the stationary seal part, and the hub are all concentric. Typically, assembling the wheel assembly with the seal requires (a) press fitting the rotating seal part onto the axle to rigidly couple the rotating seal part to the axle, and (b) press fitting the stationary seal part into the hub to rigidly couple the stationary seal part to the hub. The rotating seal part may be equipped with a rubber gasket that forms a stationary seal between the rotating seal part and the axle. Similarly, the stationary seal part may be equipped with a rubber gasket that forms a stationary seal between the stationary seal part and the hub.

SUMMARY

In an embodiment, a dry-lubricating apparatus, for press fitting onto a mating part, includes (a) a frame, (b) a rubber gasket fixed to the frame to create an interference with a mating surface of the mating part so as to enable the press fitting, and (c) a lead-in edge fixed to at least one of the frame and the rubber gasket. The lead-in edge includes a dry lubricant such that, when the dry-lubricating apparatus is slid onto the mating part, along the mating surface and with the rubber gasket trailing the lead-in edge, a portion of the dry lubricant is abraded off the lead-in edge to reduce friction between the rubber gasket and the mating surface.

In an embodiment, a method for dry-lubricated press-fit assembly of a first part onto a second part includes pressing the first part onto the second part by sliding the first part along a mating surface of the second part such that, during the sliding, the mating surface abrades a dry lubricant off a lead-in edge of the first part so as to reduce friction between the mating surface and a rubber gasket, of the first part, trailing the lead-in edge.

DETAILED DESCRIPTION OF THE EMBODIMENTS

Disclosed herein are apparatuses with a dry-lubricating lead-in edge for press-fit assemblies, as well as methods for their manufacture and use. In situations where a first part needs to be press fit onto a second part, the first part may be equipped with a dry-lubricating lead-in edge, as disclosed herein, to reduce friction between the two parts during the process of press fitting. The dry-lubricating edge may thereby reduce the forces required for press fitting and/or eliminate the need for using a wet lubricant.

Figure 1:
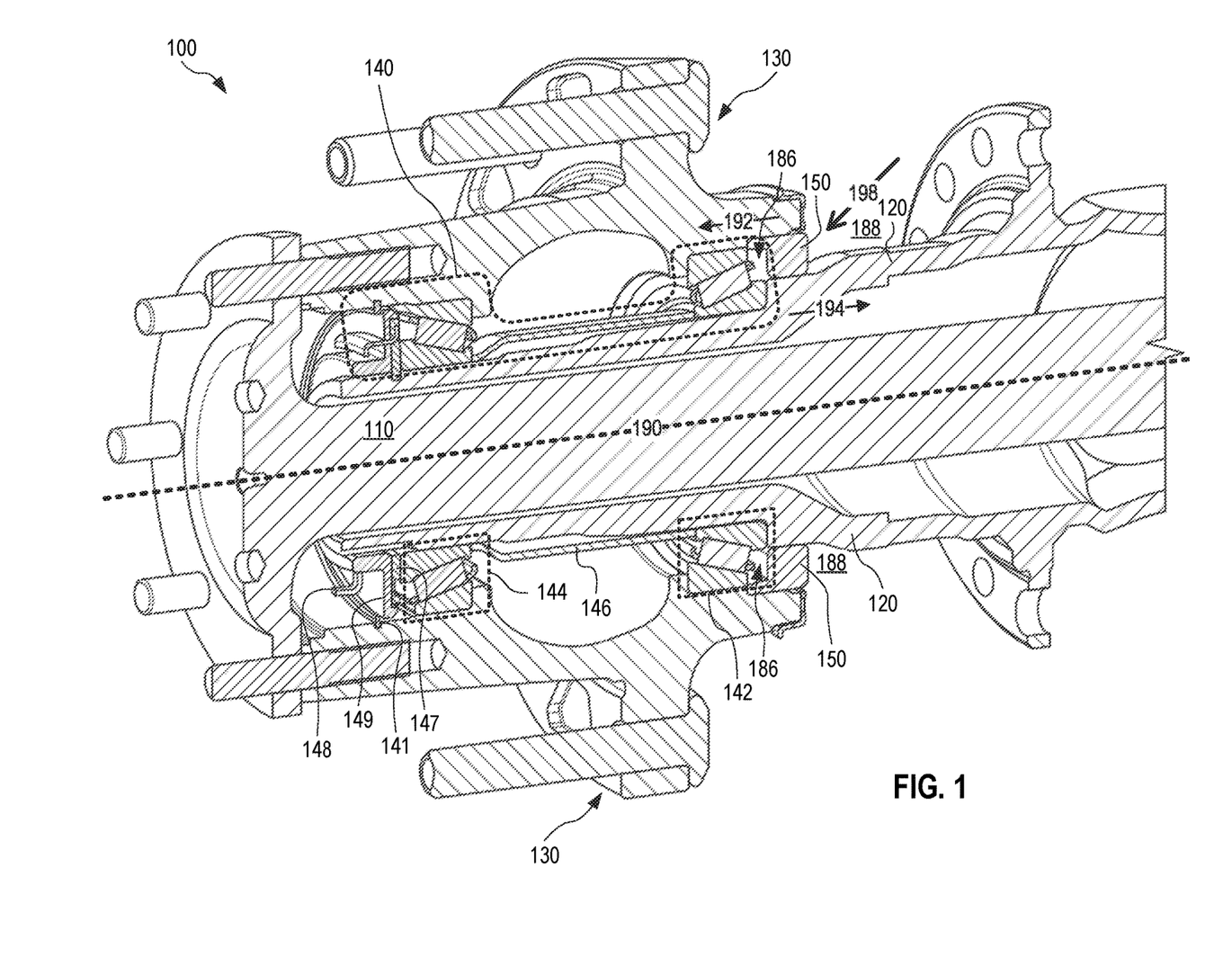
FIG. 1 illustrates a drive-wheel end of a vehicle, according to an embodiment.
Figure 2:
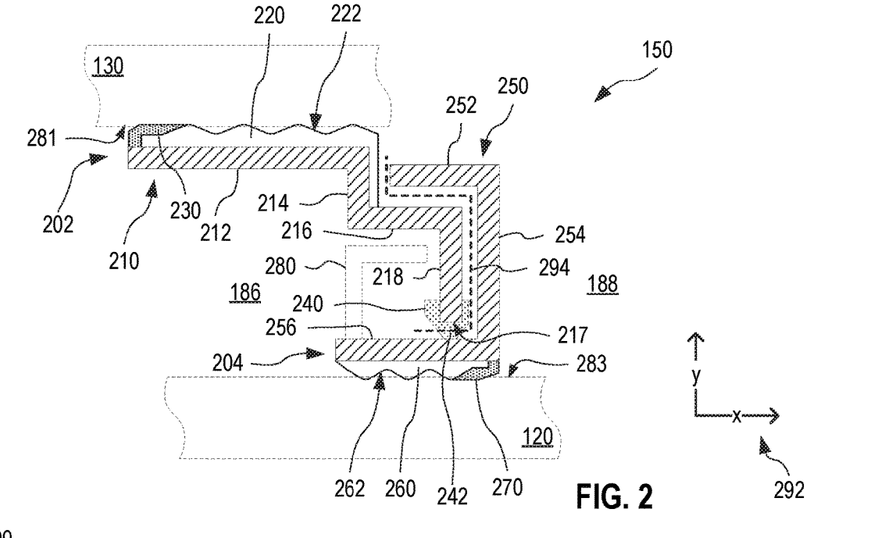
FIG. 2 shows a bearing seal of the drive-wheel end of FIG. 1 in further detail.

FIGS. 1 and 2 illustrate one scenario of use of the presently disclosed dry-lubricating lead-in edge. FIG. 1 is an isometric full-section view of a drive-wheel end 100 of a vehicle, such as a tractor. The section used in FIG. 1 contains the rotation axis 190 of drive-wheel end 100. Drive-wheel end 100 includes a bearing seal 150. FIG. 2 is a cross-sectional view showing bearing seal 150 in further detail, with the cross section taken in a plane that includes rotation axis 190 (outside the view of FIG. 2). FIG. 2 depicts the portion of bearing seal 150 also depicted in FIG. 1 in the region indicated by arrow 198. Bearing seal 150 includes two dry-lubricating lead-in edges that aid installation of bearing seal 150 in drive-wheel end 100. FIGS. 1 and 2 are best viewed together in the following description.

Drive-wheel end 100 includes an axle shaft 110, an axle 120, a hub assembly 130, a bearing system 140, and bearing seal 150. Hub assembly 130 is rigidly attached to axle shaft 110 and is configured to accommodate a wheel (not shown in FIGS. 1 and 2) of the vehicle. Axle 120 supports at least part of the load of the vehicle. To engage drive-wheel end 100, an engine rotates axle shaft 110 via a drive line, which causes hub assembly 130 to rotate about axle 120.

Bearing system 140 reduces friction between hub assembly 130 and axle 120. For this purpose, bearing system 140 includes an inboard bearing 142 and an outboard bearing

144. In one implementation, bearing system 140 further includes (a) a spacer 146 limiting endplay of inboard bearing 142 and outboard bearing 144, (b) a lock ring 148, a lock washer 147, and a spindle nut 149 secured to axle 120, and (c) a snap ring 141 secured to hub assembly 130. Spacer 146, lock ring 148, lock washer 147, spindle nut 149, and snap ring 141 cooperate to keep inboard bearing 142 and outboard bearing 144 properly positioned. Bearing system 140 requires lubrication, such as oil or grease, at inboard bearing 142, outboard bearing 144, and bearing seal 150 to achieve low-friction rotation of hub assembly 130 about axle 120.

Bearing seal 150 seals an "oil side" 186, associated with bearing system 140 and its lubrication, from an "air side" 188 that is external to drive-wheel end 100. Bearing seal 150 serves to prevent or at least reduce (a) loss of lubrication from oil side 186 to air side 188, and (b) penetration of contaminants (e.g., external fluids, particles, and/or dirt) from air side 188 to oil side 186 and into bearing system 140. Penetration of such contaminants into bearing system 140 may be detrimental to the bearing system lubricant, increase friction in bearing system 140, and cause damage in bearing system 140.

As shown in FIG. 2, bearing seal 150 includes a dry-lubricating seal case 202 and a dry-lubricating sleeve 204. Each of seal case 202 and sleeve 204 encircles the rotation axis of bearing seal 150 (i.e., rotation axis 190, FIG. 1). The x-axis of coordinate system 292, depicted in FIG. 2, is parallel to rotation axis 190. The y-axis of coordinate system 292 is perpendicular to rotation axis 190. Sleeve 204 is rotatable, relative to seal case 202, about rotation axis 190. Seal case 202 is affixed to hub assembly 130, and sleeve 204 is affixed to axle 120. Seal case 202 and sleeve 204 are a distance apart from each other to form a labyrinthine path 294 from oil side 186 to air side 188. Bearing seal 150 may include one or more elastomers bridging across labyrinthine path 294 between seal case 202 and sleeve 204, for example the elastomer 240 depicted in FIG. 2. Elastomer 240 encircles rotation axis 190, is affixed to a radially innermost edge 217 of seal case 202, and forms a lip 242 that contacts an innermost axial leg 256 of sleeve 204. Labyrinthine path 294, optionally together with elastomer 240, forms a dynamic seal. To avoid leaks around bearing seal 150, seal case 202 is affixed to hub assembly 130 in such a way as to form a static seal therebetween, and sleeve 204 is affixed to axle 120 in such a way as to form a static seal therebetween.

Herein, "radial" refers to the dimensions orthogonal to rotation axis 190, "axial" refers to the dimension parallel to rotation axis 190, "radial leg" refers to a leg with a predominantly radial orientation, and "axial leg" refers to a leg with a predominantly axial orientation.

As part of the process to assemble drive-wheel end 100 with bearing seal 150 installed therein, sleeve 204 is press fit along direction 194 onto axle 120, and seal case 202 is press fit along direction 192 into hub assembly 130. Subsequently, hub assembly 130 is mounted on axle 120 such that seal case 202 and sleeve 204 come together to form bearing seal 150.

Seal case 202 includes a frame 210, a rubber gasket 220, and a dry-lubricating lead-in edge 230. Rubber gasket 220 enables press fitting of seal case 202 into hub assembly 130, and lead-in edge 230 provides dry lubrication for this press fitting process. Rubber gasket 220 is affixed to an outer-diameter leg 212 of frame 210. Rubber gasket 220 forms a surface 222 which may, but need not, be ribbed. Rubber gasket 220 creates an interference with a mating surface 281 of hub assembly 130, thereby enabling press fitting of seal case 202 into hub assembly 130. Outer-diameter leg 212 and mating surface 281 may be concentric. Typically, the degree of interference between rubber gasket 220 and mating surface 281, required to securely fasten seal case 202 to hub assembly 130, produces a need for lubrication at the interface between surface 222 and mating surface 281 so as to keep the forces, required for the press fit assembly of seal case 202 into hub assembly 130, manageable (e.g., at a level that does not impose risk of damaging seal case 202 or hub assembly 130). Lead-in edge 230 is coupled to one or both of frame 210 and rubber gasket 220. The material of lead-in edge 230 is composed of or includes a dry lubricant. When seal case 202 is slid along mating surface 281, in the process of press fitting seal case 202 into hub assembly 130, mating surface 281 abrades material off lead-in edge 230. This material is, or includes, dry lubricant. Since surface 222 of rubber gasket 220 trails lead-in edge 230, dry lubricant abraded off lead-in edge 230 lubricates the interface between surface 222 and mating surface 281.

In the absence of dry-lubricating lead-in edge 230, addition of a separate lubricant, typically a wet lubricant, would be required to keep the press fitting forces manageable. However, addition of such a separate lubricant is an extra process step as compared to a process that utilizes dry-lubricating lead-in edge 230. In addition, a separate lubricant could potentially come into contact with and thus contaminate other surfaces during the assembly process. This is particularly concerning if the separate lubricant is a wet lubricant, since wet lubricants tend to attract dirt. Dry-lubricating lead-in edge 230 eliminates the need for addition of a separate lubricant, and dry-lubricating lead-in edge 230 inherently deposits lubricant only where it is needed. Furthermore, since the lubricant provided by lead-in edge 230 is dry, the risk of this lubricant attracting dirt is greatly diminished, as compared to a wet lubricant.

Sleeve 204 includes a frame 250, a rubber gasket 260, and a dry-lubricating lead-in edge 270. In a manner similar to that discussed for seal case 202, rubber gasket 260 enables press fitting of sleeve 204 onto axle 120, and lead-in edge 270 provides dry lubrication for this press fitting process. Rubber gasket 260 is affixed to inner-most axial leg 256 of frame 250. Rubber gasket 260 forms a surface 262 which may, but need not, be ribbed. Rubber gasket 260 creates an interference with a mating surface 283 of axle 120, thereby enabling press fitting of sleeve 204 onto axle 120. Inner-most axial leg 256 and mating surface 283 may be concentric. Typically, the degree of interference between rubber gasket 260 and mating surface 283, required to securely fasten sleeve 204 to axle 120, produces a need for lubrication at the interface between surface 262 and mating surface 283 so as to keep the forces, required for the press fit assembly of sleeve 204 onto axle 120, manageable. Lead-in edge 270 is coupled to one or both of frame 250 and rubber gasket 260. The material of lead-in edge 270 is composed of or includes a dry lubricant. When sleeve 204 is slid along mating surface 283, in the process of press fitting sleeve 204 onto axle 120, mating surface 283 abrades material off lead-in edge 270. This material is, or includes, dry lubricant. Since surface 262 of rubber gasket 260 trails lead-in edge 270, dry lubricant abraded off lead-in edge 270 lubricates the interface between surface 262 and mating surface 283. Dry-lubricating lead-in edge 270 thus provides benefits similar to those provided by dry-lubricating lead-in edge 230.

Lead-in edges 230 and 270 may be chamfered, as shown in FIG. 2, rounded, or square. Lead-in edge 230 may be attached only to rubber gasket 220, or only to frame 210, without departing from the scope hereof. Similarly, lead-in edge 270 may be attached only to rubber gasket 260, or only to frame 250, without departing from the scope hereof.

In the embodiment depicted in FIG. 2, frame 210 of seal case 202 includes outer-diameter leg 212, a radial leg 214, an axial leg 216, and a radial leg 218, serially connected to each other in the order listed. Radial leg 218 forms inner-most edge 217. Without departing from the scope hereof, frame 210 may be configured with more, fewer, or different legs than those depicted in FIG. 2, as long as frame 210 includes outer-diameter leg 212 and is capable of cooperating with sleeve 204 to form a labyrinthine path. Edges where two legs of frame 210 connect to each other may be rounded, although depicted in FIG. 2 as being square.

In the embodiment depicted in FIG. 2, frame 250 of sleeve 204 includes inner-most axial leg 256, a radial leg 254, and an axial leg 252, serially connected to each other in the order listed. Without departing from the scope hereof, frame 250 may be configured with more, fewer, or different legs than those depicted in FIG. 2, as long as frame 250 includes inner-most axial leg 256 and is capable of cooperating with seal case 202 to form a labyrinthine path. Edges where two legs of frame 250 connect to each other may be rounded, although depicted in FIG. 2 as being square.

Bearing seal 150 may further include a retaining ring 280 that encircles rotation axis 190.

Without departing from the scope hereof, bearing seal 150 may be used in other types of wheel assemblies, and/or to seal other types of bearings, than depicted in FIG. 1. Generally, though, seal case 202 is press fit to a radially inward-facing mating surface of one part, and sleeve 204 is press fit to a radially outward-facing mating surface of another part.

Figure 3:
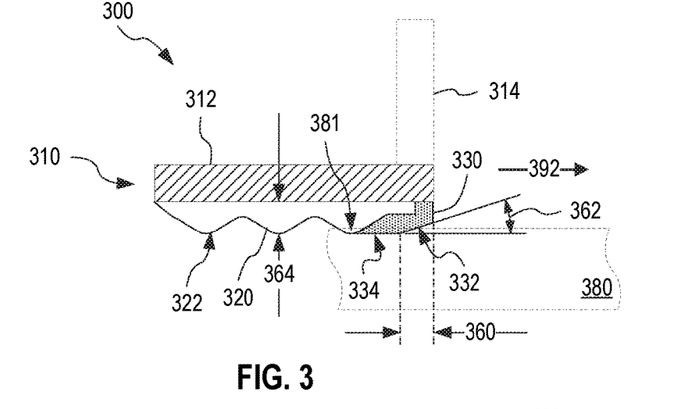
FIG. 3 illustrates a dry-lubricating apparatus, including a chamfered dry-lubricating lead-in edge, for press fitting onto a mating part, according to an embodiment.

FIG. 3 illustrates, in cross-sectional view, one dry-lubricating apparatus 300, including a chamfered dry-lubricating lead-in edge 330, for press fitting onto a mating part 380. Apparatus 300 includes a frame 310, a rubber gasket 320, and chamfered dry-lubricating lead-in edge 330. Frame 310 includes a leg 312, and optionally also at least one additional leg 314. Rubber gasket 320 is affixed to leg 312. In one example, rubber gasket 320 is molded onto leg 312. Rubber gasket 320 has a surface 322. Surface 322 may be ribbed. Lead-in edge 330 is affixed to one or both of frame 310 and rubber gasket 320. Apparatus 300 is configured to be press fit onto a mating surface 381 of mating part 380 by sliding apparatus 300 along mating surface 381 in direction 392.

It is understood that leg 312 may have any thickness, for example a thickness that greatly exceeds the thickness of rubber gasket 320 and/or exceeds the length of leg 312 along direction 392.

Lead-in edge 330 is composed of, or includes, a dry lubricant. When apparatus 300 is slid along mating surface 381 along direction 392, mating surface 381 abrades material off lead-in edge 330. This material is or includes dry lubricant. Surface 322 of rubber gasket 320 trails lead-in edge 330 and is therefore slid across dry lubricant deposited onto mating surface 381 after having been abraded off lead-in edge 330. Thus, lead-in edge 330 provides dry lubricant that reduces friction between rubber gasket 320 and mating surface 381. By virtue of dry-lubricating lead-in edge 330, dry-lubricating apparatus 300 may be press fit onto mating part 380 without using a separate lubricant, e.g., a wet lubricant. Dry-lubricating apparatus 300 thereby facilitates a simple and clean press fit assembly process, as compared to press fit assembly processes without dry-lubricating lead-in edge 330, without imposing challenging force requirements on the press fit assembly process.

In certain embodiments, apparatus 300 has a cylindrical shape. In one such embodiment, surface 322 faces radially inward and apparatus 300 is configured to be press fit into a bore of mating part 380, with mating surface 381 defining an inner-diameter of this bore. Seal case 202 is an example of this embodiment of apparatus 300. In another such embodiment, surface 322 faces radially outward and apparatus 300 is configured to be press fit onto a cylinder of mating part 380, with mating surface 381 defining an outer-diameter of this cylinder. Sleeve 204 is an example of this embodiment of apparatus 300.

In another embodiment, apparatus 300, or at least leg 312, is non-cylindrical but yet of an enclosed shape (e.g., square) configured to be press fit around mating part 380 having a cylindrical or non-cylindrical mating surface 381. In a related embodiment, apparatus 300, or at least leg 312, is non-cylindrical but surface 322 is outward-facing and of an enclosed shape (e.g., square) configured to be press fit into a bore of mating part 380. This bore may be cylindrical or non-cylindrical. In certain implementations of these two embodiments, the shape of mating surface 381 mimics the general shape of leg 312. In other implementations of these two embodiments, the shape of mating surface 381 differs from the general shape of leg 312.

In yet another embodiment, leg 312 is planar and apparatus 300 is configured to be press fit onto a planar mating surface 381.

More generally, the configuration apparatus 300 is applicable to situations where a first part needs to be press fit onto a second part, regardless of the exact shape of these parts. In such situations, the first part may have the configuration of apparatus 300 to reduce friction between the two parts during the process of press fitting.

Dry-lubricating lead-in edge 330 has a chamfer 332. Chamfer 332 may ease the step of initially slipping apparatus 300 onto mating surface 381 and/or reduce gripping during sliding of apparatus 300 on mating surface 381. Chamfer 332 is oriented at an angle 362 to mating surface 381. Angle 362 is, for example, in the range between 15 and 30 degrees, or in the range between 10 and 45 degrees. In the dimension parallel to direction 392, chamfer 332 has extent 360. Extent 360 may be in the range between one and five millimeters, such as in the range between 1.8 and 3.0 millimeters.

In an embodiment, lead-in edge 330 has a non-chamfered portion 334 that trails chamfer 332. This embodiment of lead-in edge 330 may cause a greater amount of dry lubricant being abraded off lead-in edge 330 by mating surface, and thus made available to rubber gasket 320, than embodiments of lead-in edge 330 without non-chamfered portion 334.

Rubber gasket 320 has thickness 364 away from leg 312. Lead-in edge 330 may extend away from leg 312 to the level of thickness 364 (when not compressed by press fitting), as depicted in FIG. 3. Alternatively, lead-in edge 330 may extent away from leg 312 to a level that as less than thickness 364 or more than thickness 364. The amount of dry lubricant abraded off lead-in edge 330 by mating surface 381 may be tuned by adjusting the several parameters of apparatus 300, such as the material of lead-in edge 330, the extent of lead-in edge 330 away from leg 312 relative to thickness 364, the length of extent 360, and angle 362. The optimal shape and composition of lead-in edge 330 may depend on the compressibility of rubber gasket 320 and/or the friction properties of surface 322 and mating surface 381.

Lead-in edge 330 may be hydrophobic and/or corrosion resistant, for example to help protect the interface between rubber gasket 320 and mating surface 381. Such protection is particularly advantageous when the interface between rubber gasket 320 and mating surface 381 must form a static seal, such as the static seal between seal case 202 and hub assembly 130 and the static seal between sleeve 204 and axle 120.

In one embodiment, lead-in edge 330 is composed of, or includes, a thermoplastic, such as polyoxymethylene (e.g., Delrin). In another embodiment, lead-in edge 330 is composed of, or includes, polytetrafluoroethylene. In yet another embodiment, lead-in edge 330 includes molybdenum disulfide and/or graphite. For example, lead-in edge 330 may be a mixture of a (a) polymer and (b) molybdenum disulfide and/or graphite. Polymer-based embodiments of lead-in edge 330 may be formed as a mechanically stable structure, e.g., a rigid or flexible solid ring, that is then mounted on rubber gasket 320 and/or frame 310. Alternatively, lead-in edge 330 is a wax, or wax-like material, that is molded on rubber gasket 320 and/or frame 310. Lead-in edge 330 may be composed of a wax, such as beeswax, paraffin, or carnauba wax. Alternatively, lead-in edge 330 includes a wax and one or more additional dry lubricants, e.g., molybdenum disulfide, graphite, and/or polytetrafluoroethylene.

Figure 4:
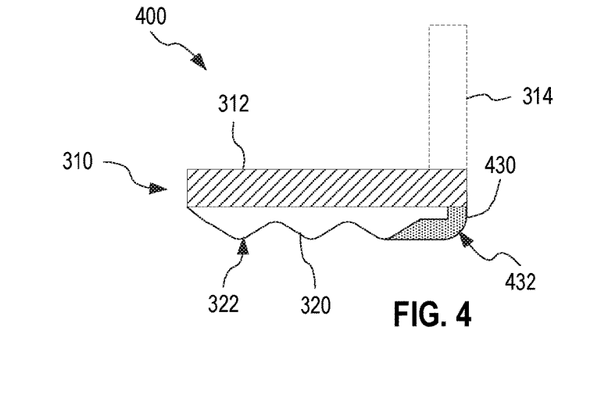
FIG. 4 illustrates a dry-lubricating apparatus, including a rounded dry-lubricating lead-in edge, for press fitting onto mating part, according to an embodiment.

FIG. 4 illustrates, in cross-sectional view, one dry-lubricating apparatus 400, including a rounded dry-lubricating lead-in edge 430, for press fitting onto mating part 380 (FIG. 3). Apparatus 400 is similar to apparatus 300 except for lead-in edge 430 replacing lead-in edge 330. Lead-in edge 430 is similar to lead-in edge 330 apart from chamfer 332 being replaced by a rounded edge 432. Rounded edge 432 may have radius of curvature in the range between one and five millimeters, for example between 1.8 and 3.0 millimeters.

In a modification of apparatus 400, lead-in edge 430 is square, corresponding to a radius of curvature of zero.

Figure 5:
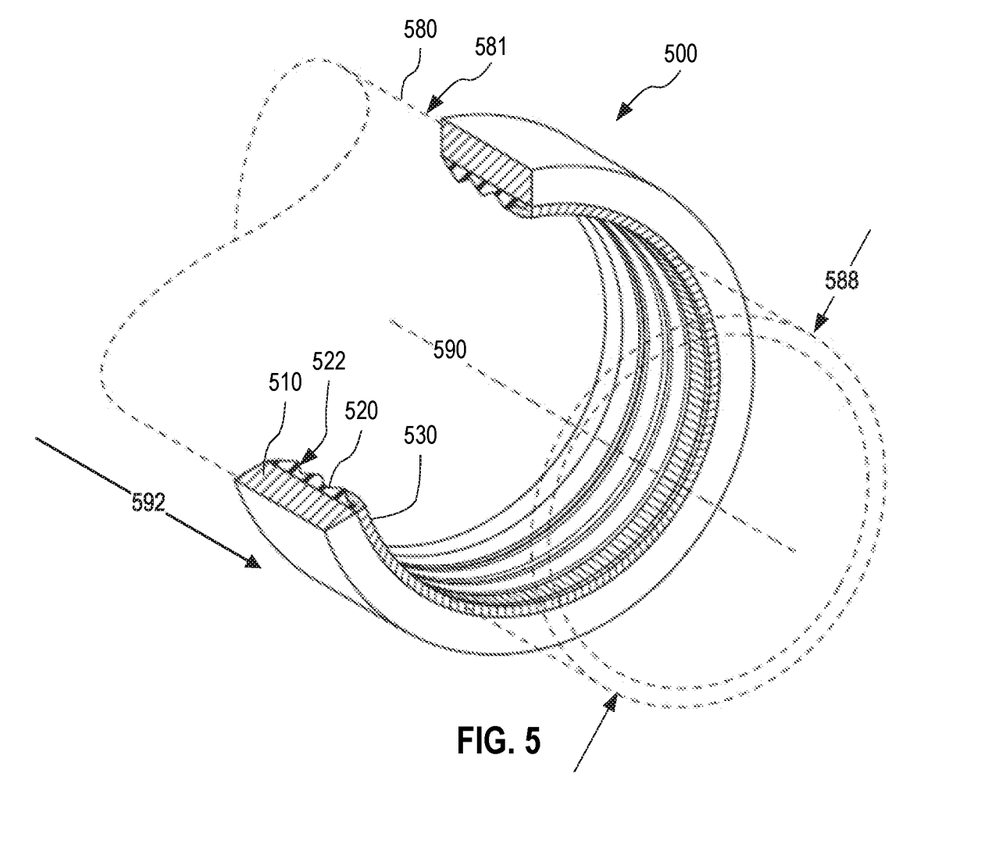
FIG. 5 illustrates a cylindrical dry-lubricating apparatus being press fit onto a cylindrical, radially outward-facing mating surface, according to an embodiment.

FIG. 5 illustrates, in perspective view, one cylindrical dry-lubricating apparatus 500 being press fit onto a radially outward-facing cylindrical mating surface 581 of a cylinder 580. To show the different components of apparatus 500, a section of apparatus 500 is cut away in FIG. 5, and cylinder 580 is depicted as being see-through. It is understood that apparatus 500 encircles cylinder 580. Apparatus 500 is an embodiment of apparatus 300.

Apparatus 500 includes a frame 510, a rubber gasket 520 having a radially inward-facing surface 522, and a chamfered lead-in edge 530. Frame 510, rubber gasket 520, and lead-in edge 530 are cylindrical embodiments of frame 310, rubber gasket 320, and lead-in edge 330, respectively. Apparatus 500 is press fit onto cylinder 580 along a direction 592. In one implementation, the diameter 588 of mating surface 581 is in the range between 3 and 15 inches.

In an alternative embodiment, not illustrated in FIG. 5, apparatus 500 is instead configured with a rounded lead-in edge and is thus an embodiment of apparatus 400, or apparatus 500 is configured with a square modification of lead-in edge 430 of apparatus 400. Cylinder 580 may be hollow or solid, without departing from the scope hereof.

Figure 6:
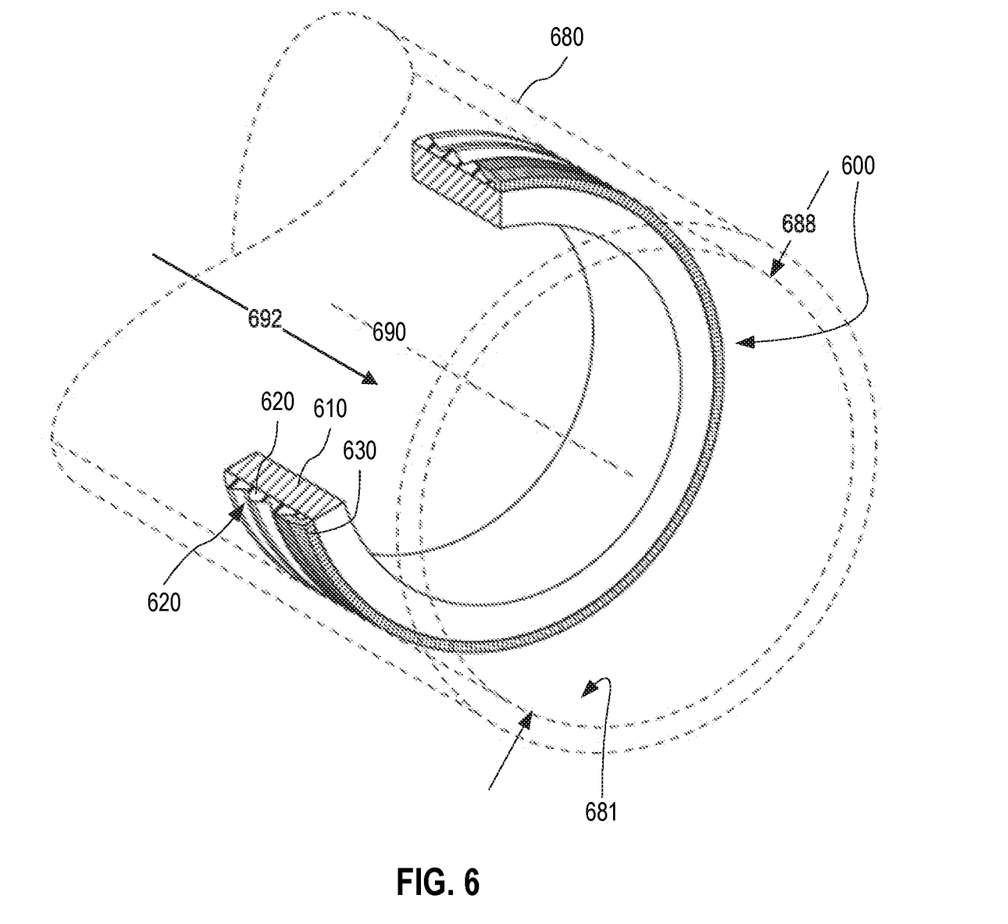
FIG. 6 illustrates a cylindrical dry-lubricating apparatus being press fit into a bore against a radially-inward facing cylindrical mating surface, according to an embodiment.

FIG. 6 illustrates, in perspective view, one cylindrical dry-lubricating apparatus 600 being press fit into a bore of a cylinder 680 against a radially inward-facing cylindrical mating surface 681 of cylinder 680. To show the different components of apparatus 600, a section of apparatus 600 is cut away in FIG. 6, and cylinder 680 in depicted as being see-through. Apparatus 600 and cylinder 680 share a common cylinder axis 690 encircled by each of cylinder 680 and apparatus 600. Apparatus 600 is an embodiment of apparatus 300.

Apparatus 600 includes a frame 610, a rubber gasket 620 having a radially outward-facing surface 622, and a chamfered lead-in edge 630. Frame 610, rubber gasket 620, and lead-in edge 630 are cylindrical embodiments of frame 310, rubber gasket 320, and lead-in edge 330. Apparatus 600 is press fit into the bore of cylinder 680 against mating surface 681 along a direction 692. In one implementation, the diameter 688 of mating surface 681 is in the range between 4 and 16 inches.

In an alternative embodiment, not illustrated in FIG. 6, apparatus 600 is instead configured with a rounded lead-in edge and is thus an embodiment of apparatus 400, or apparatus 600 is configured with a square modification of lead-in edge 430 of apparatus 400. Without departing from the scope hereof, cylinder 680 may be replaced with a non-cylindrical object forming a bore defined, at least in part, by a radially inward-facing cylindrical mating surface.

Figure 7:
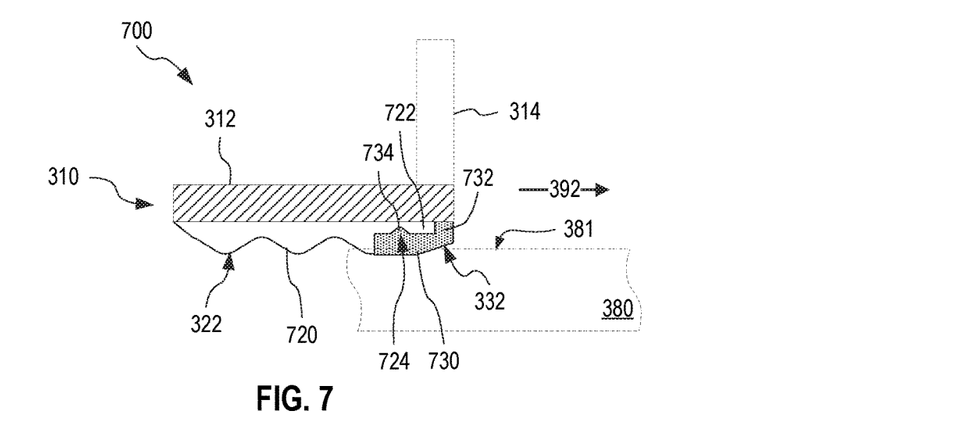
FIG. 7 illustrates a dry-lubricating apparatus with a dry-lubricating lead-in edge snap fit onto a rubber gasket of the apparatus and also directly coupled to a frame of the apparatus, according to an embodiment.

FIG. 7 illustrates one dry-lubricating apparatus 700 with a dry-lubricating lead-in edge 730 snap fit onto a rubber gasket of apparatus 700 and also directly coupled to a frame of apparatus 700. As depicted in FIG. 7, lead-in edge 730 is chamfered and apparatus 700 is an embodiment of apparatus 300. However, without departing from the scope hereof, lead-in edge 730 may instead be rounded, in which case apparatus 700 is an embodiment of apparatus 400, or lead-in edge 730 may be square such that apparatus 700 is an embodiment of a modification of apparatus 400 having a square lead-in edge 430. Apparatus 700 may be cylindrical and form an embodiment of apparatus 500 or 600.

In addition to lead-in edge 730, apparatus 700 includes frame 310 and a rubber gasket 720. Rubber gasket 720 is an embodiment of rubber gasket 320, shaped to allow direct coupling between a lip 732 of lead-in edge 730 and frame 310. In addition, rubber gasket 720 forms an undercut 724. Lead-in edge 730 includes a protruding ridge 734 shaped to fit in undercut 724. Lead-in edge 730 is a solid piece formed separately from the frame 310 and rubber gasket 720. When mounting lead-in edge 730 in apparatus 700, protruding ridge 734 is snapped into undercut 724. This snap fit, together with portion 732 leading a portion 722 of rubber gasket 720, may improve retention of lead-in edge 730 in apparatus 700, especially when apparatus 700 is slid along mating surface 381 in direction 392.

In cylindrical embodiments of apparatus 700 (e.g., as shown in FIGS. 5 and 6), lead-in edge 730 is a ring and may be press fit onto one or both of rubber gasket 720 and frame 310 to further improve retention of lead-in edge 730 in apparatus 700.

Figure 8:
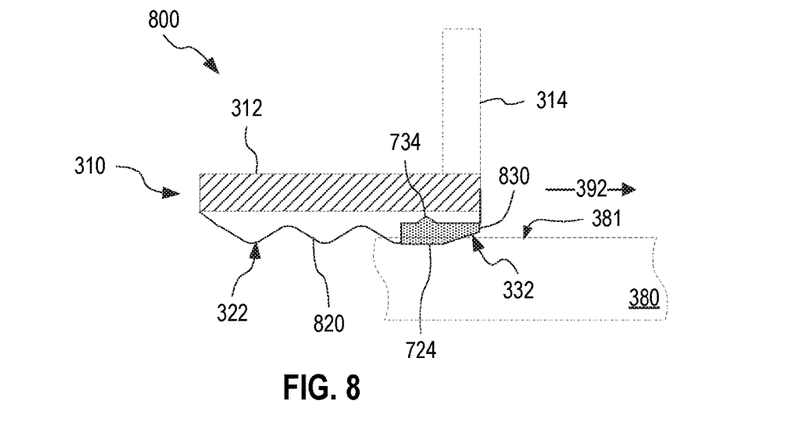
FIG. 8 illustrates a dry-lubricating apparatus with a dry-lubricating lead-in edge snap fit onto a rubber gasket of the apparatus without being directly coupled to the frame of the apparatus, according to an embodiment.

FIG. 8 illustrates one dry-lubricating apparatus 800 with a dry-lubricating lead-in edge 830 snap fit onto a rubber gasket of apparatus 800 without being directly coupled to the frame of apparatus 800. Apparatus 800 is a modification of apparatus 700, wherein lead-in edge 830 is not directly coupled to frame 310 of apparatus 800. Apparatus 800 implements a rubber gasket 820 that occupies the space that, in apparatus 700, is occupied by lip 732.

Figure 9:
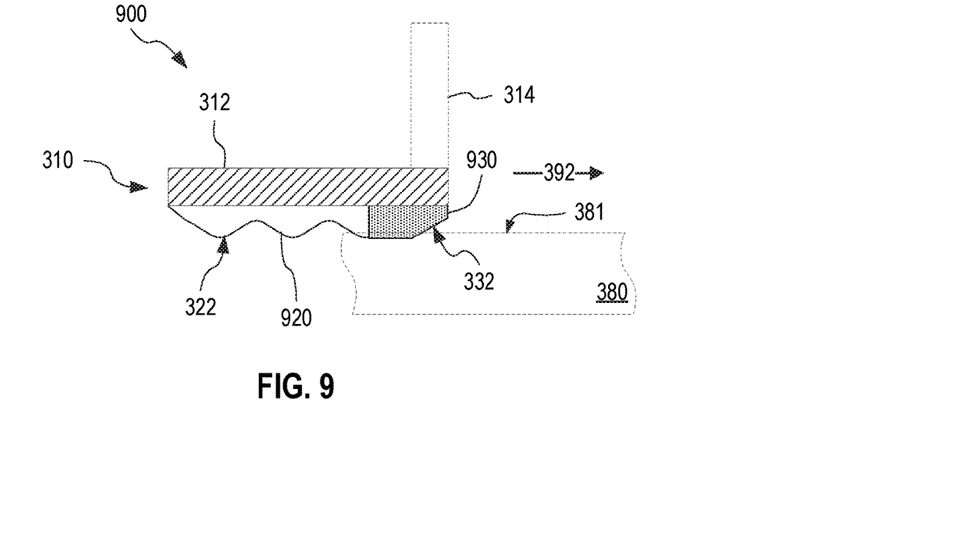
FIG. 9 illustrates a dry-lubricating apparatus with a dry-lubricating lead-in edge mounted exclusively to the frame of the apparatus, according to an embodiment.

FIG. 9 illustrates one dry-lubricating apparatus 900 with a dry-lubricating lead-in edge 930 mounted exclusively to the frame of apparatus 900. As depicted in FIG. 9, lead-in edge 930 is chamfered and apparatus 900 is an embodiment of apparatus 300. However, without departing from the scope hereof, lead-in edge 930 may instead be rounded, in which case apparatus 900 is an embodiment of apparatus 400, or lead-in edge 930 may be square such that apparatus 900 is an embodiment of a modification of apparatus 400 having a square lead-in edge 430. Apparatus 900 may be cylindrical and form an embodiment of apparatus 500 or 600.

In addition to lead-in edge 930, apparatus 900 includes frame 310 and a rubber gasket 920. Rubber gasket 920 is an embodiment of rubber gasket 320, shaped to (a) allow direct coupling between lead-in edge 930 and frame 310 and (b) exclusively trail lead-in edge 930.

In one embodiment, lead-in edge 930 is a solid piece formed separately from the frame 310 and rubber gasket 920. This embodiment of lead-in edge 930 may be press fit onto frame 310. In another embodiment, lead-in edge 930 is a wax or wax-like material that is deposited on frame 310, next to rubber gasket 920, in softened form and then, subsequently, allowed to harden.

Figure 10:
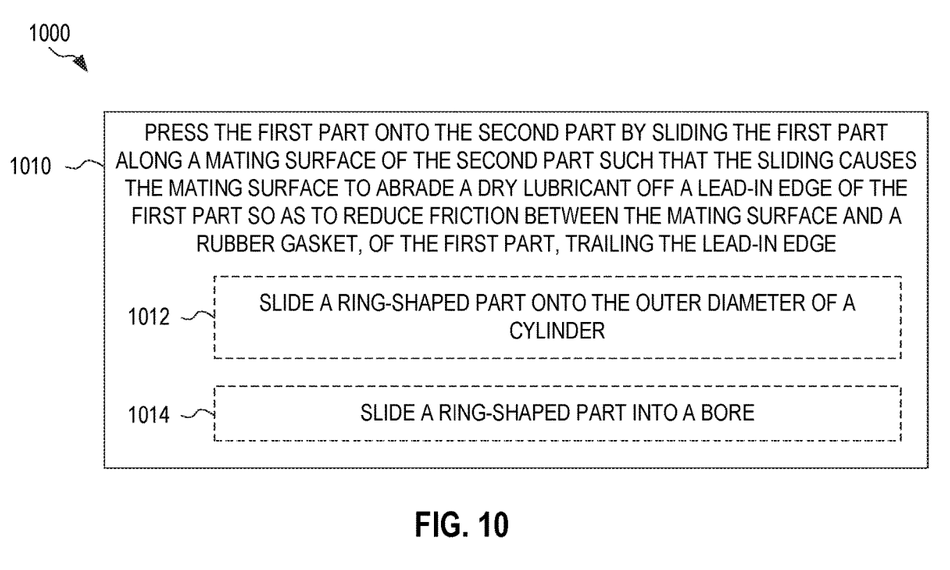
FIG. 10 illustrates a method for dry-lubricated press-fit assembly of a first part onto a second part, according to an embodiment.

FIG. 10 illustrates one method 1000 for dry-lubricated press-fit assembly of a first part onto a second part. The first part is, for example, apparatus 300. Method 1000 includes a step 1010 that press fits the first part onto the second part by sliding the first part along a mating surface of the second part such that the sliding causes the mating surface to abrade a dry lubricant off a lead-in edge of the first part so as to reduce friction between the mating surface and a rubber gasket, of the first part, trailing the lead-in edge. In one example of step 1010, apparatus 300 is press fit onto mating part 380 by sliding apparatus 300 along mating surface 381 in direction 392. As discussed above in reference to FIG. 3, mating surface 381 abrades a dry lubricant off lead-in edge 330, and this dry lubricant reduces friction between rubber gasket 320 and mating surface 381.

In one embodiment, step 1010 includes a step 1012 of sliding a ring-shaped part onto the outer diameter of a cylinder. In one example of step 1012, apparatus 500 is slid onto cylinder 580 as shown in FIG. 5. In another example of step 1012, sleeve 204 is slid onto axle 120 as discussed above in reference to FIGS. 1 and 2. In another embodiment, step 1010 includes a step 1014 of sliding a ring-shaped part into a bore. In one example of step 1014, apparatus 600 is slid into bore 682 as shown in FIG. 6. In another example of step 1014, seal case 202 is slid into hub assembly 130 as discussed above in reference to FIGS. 1 and 2.

Figure 11:
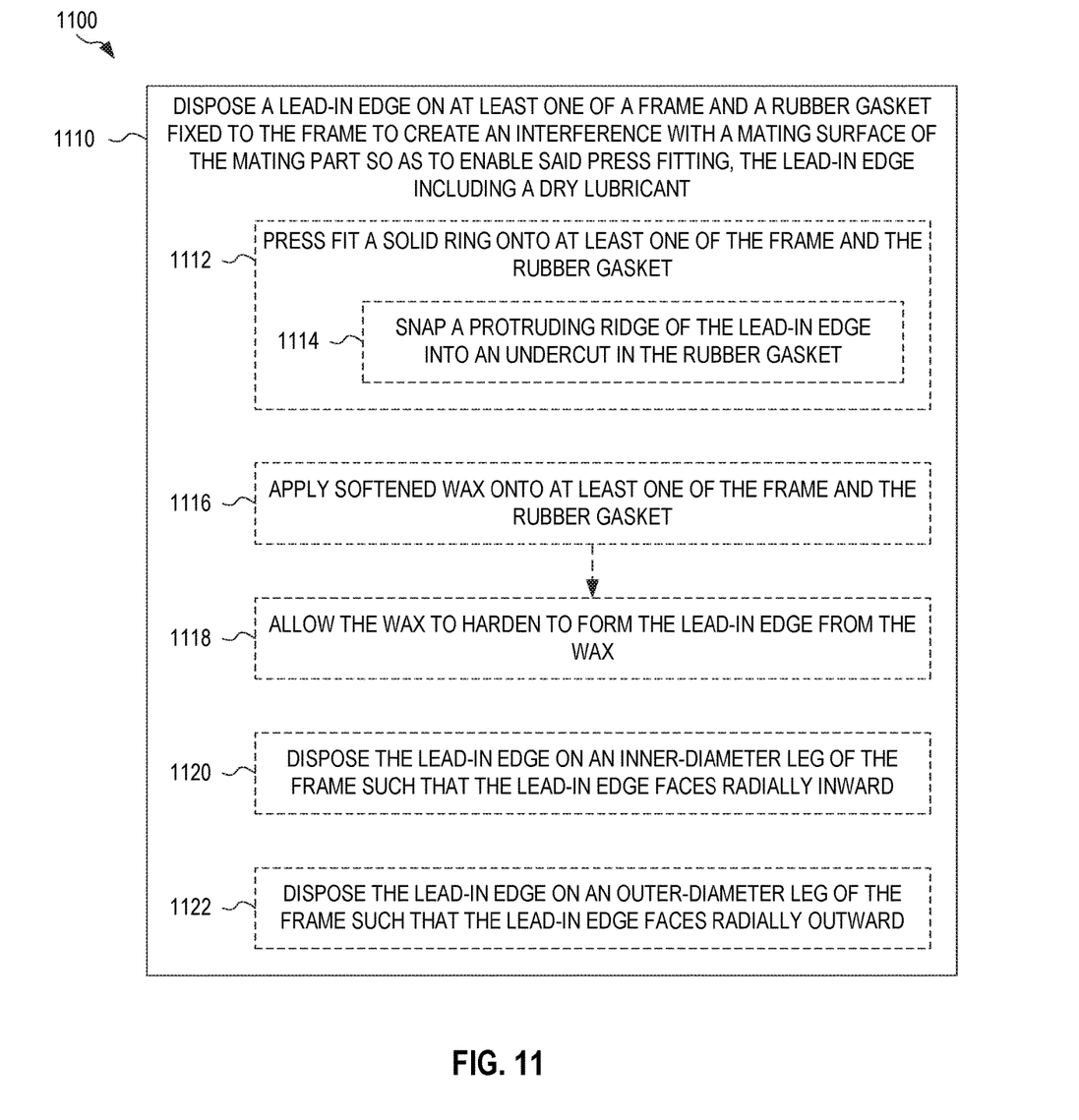
FIG. 11 illustrates a method for manufacturing a dry-lubricating apparatus for press fitting onto a mating part, according to an embodiment.

FIG. 11 illustrates one method 1100 for manufacturing a dry-lubricating apparatus for press fitting onto a mating part. Method 1100 is for example used to manufacture apparatus 300. Method 1100 includes a step 1110 of disposing a lead-in edge on at least one of a frame and a rubber gasket fixed to the frame to create an interference with a mating surface of the mating part so as to enable said press fitting. The lead-in edge includes a dry lubricant. In one example of step 1110, lead-in edge 330 is disposed on one or both of frame 310 and rubber gasket 320.

In one embodiment, step 1110 includes a step 1112 of press fitting a solid ring onto at least one of the frame and the rubber gasket. In one example of step 1112, lead-in edge 530 is press fit onto one or both of frame 510 and rubber gasket 520. In another example of step 1112, lead-in edge 630 is press fit onto one or both of frame 610 and rubber gasket 620. Step 1112 may include a step 1114 of snapping a protruding ridge of the lead-in edge into an undercut in the rubber gasket. In one example of step 1114, protruding ridge 734 is snapped into undercut 724, as depicted in FIGS. 7 and 8.

In another embodiment, step 1110 includes steps 1116 and 1118. Steps 1116 and 1118 are an alternative to step 1112. Step 1116 applies softened wax onto at least one of the frame and the rubber gasket. Step 1118 allows the wax to harden to form the lead-in edge from the wax. In one example of steps 1116 and 1118, a softened wax is applied to one or both of frame 310 and rubber gasket 320, whereafter the wax is allowed to harden to form lead-in edge 330, as illustrated in FIG. 3.

Step 1110 may include a step 1120 or a step 1122. Step 1120 disposes the lead-in edge on an inner-diameter leg of the frame such that the lead-in edge faces radially inward. In one example of step 1120, lead-in edge 270 is disposed on inner-most axial leg 256 of frame 250 and/or rubber gasket 260, to form dry-lubricating sleeve 204. Step 1122 disposes the lead-in edge on an outer-diameter leg of the frame such that the lead-in edge faces radially outward. In one example of step 1122, lead-in edge 230 is disposed on outer-diameter leg 212 of frame 210 and/or rubber gasket 220, to form dry-lubricating seal case 202.

Figure 12:
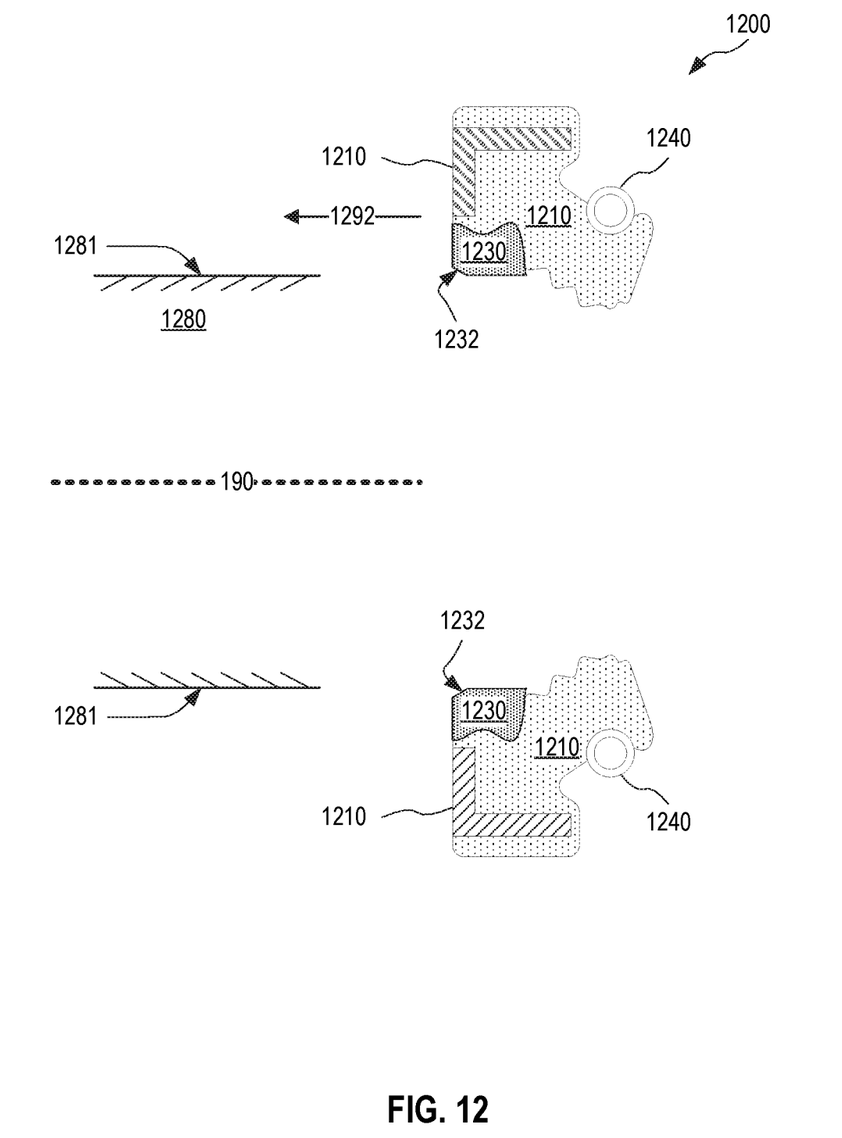
FIG. 12 illustrates another cylindrical dry-lubricating apparatus with a dry-lubricating lead-in edge, according to an embodiment.

FIG. 12 illustrates another cylindrical dry-lubricating apparatus 1200 with a dry-lubricating lead-in edge 1230. Dry-lubricating apparatus 1200 is configured to be sealed around a cylindrical surface 1281 of an object 1280. Dry-lubricating apparatus 1200 may form an embodiment of dry-lubricating apparatus 300. Dry-lubricating apparatus 1200 includes a frame 1210, an elastomer lip 1220, dry-lubricating lead-in edge 1230, and a spring 1240. Each of frame 1210, elastomer lip 1220, dry-lubricating lead-in edge 1230, and spring 1240 encircles a cylinder axis 1290. Elastomer lip 1220 is rigidly coupled to frame 1210, for example molded to frame 1210, and serves to form a dynamic seal between frame 1210 and surface 1281. Spring 1240 helps press elastomer lip 1220 against surface 1281. Dry-lubricating lead-in edge 1230 aids sliding frame 1210, with elastomer lip 1220 and spring 1240, onto surface 1281 along a direction 1292, in a manner similar to that discussed for dry-lubricating lead-in edge 330 of dry-lubricating apparatus 300.

Dry-lubricating lead-in edge 1230 may have a chamfer 1232 (as depicted in FIG. 12). Chamfer 1232 is similar to chamfer 332. However, without departing from the scope hereof, dry-lubricating edge 1230 may be configured with a rounded edge (similar to rounded edge 432) instead of chamfer 1232, or be configured with a square edge that is neither chamfered nor rounded.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present systems and methods, which, as a matter of language, might be said to fall therebetween.

What is claimed is:

1. A dry-lubricating apparatus for press fitting onto a mating part, comprising:
   a frame;
   a rubber gasket fixed to the frame to create an interference with a mating surface of the mating part so as to enable said press fitting; and
   a lead-in edge fixed to at least one of the frame and the rubber gasket, the lead-in edge including a dry lubricant such that, when the dry-lubricating apparatus is slid onto the mating part, along the mating surface and with the rubber gasket trailing the lead-in edge, a portion of the dry lubricant is abraded off the lead-in edge to reduce friction between the rubber gasket and the mating surface.

2. The dry-lubricating apparatus of claim 1, the lead-in edge being chamfered or rounded.

3. The dry-lubricating apparatus of claim 1, the frame being ring-shaped and having an inner-diameter leg defining a central aperture of the frame, the rubber gasket being fixed to a radially-inward facing surface of the inner-diameter leg.

4. The dry-lubricating apparatus of claim 3, being a sleeve of a bearing seal.

5. The dry-lubricating apparatus of claim 1, the frame being ring-shaped and having an outer-diameter leg, the rubber gasket being fixed to a radially-outward facing surface of the outer-diameter leg.

6. The dry-lubricating apparatus of claim 5, being a seal case of a bearing seal.

7. The dry-lubricating apparatus of claim 1, the rubber gasket forming an undercut for capturing a protruding ridge of the lead-in edge so as to lock the lead-in edge to the rubber gasket, the protruding ridge facing away from the mating surface when the dry-lubricating apparatus is slid onto the mating part.

8. The dry-lubricating apparatus of claim 1, the lead-in edge being composed of a hydrophobic material.

9. The dry-lubricating apparatus of claim 1, the lead-in edge being composed of a corrosion-resistant material.

10. The dry-lubricating apparatus of claim 1, the lead-in edge including a thermoplastic.

11. The dry-lubricating apparatus of claim 10, the lead-in edge being press fit onto the rubber gasket.

12. The dry-lubricating apparatus of claim 1, the lead-in edge being composed of wax.

13. The dry-lubricating apparatus of claim 1, the lead-in edge including at least one of graphite and molybdenum disulfide.

14. The dry-lubricating apparatus of claim 1, the lead-in edge forming a chamfer that is at an angle between 15 and 30 degrees relative to the mating surface when the dry-lubricating apparatus is slid onto the mating part.

15. The dry-lubricating apparatus of claim 14, the chamfer having a length in direction along which the lead-in edge is slid onto the mating part, the length being between one and five millimeters.

16. The dry-lubricating apparatus of claim 1, the lead-in edge being rounded with a radius of curvature between one and five millimeters.

17. The dry-lubricating apparatus of claim 1,
the frame including a leading edge that is rounded or chamfered in a direction that, when the dry-lubricating apparatus is slid onto the mating part, is away from the mating surface; and
the lead-in edge including (a) a leading portion fixed directly to the leading edge, and (b) a trailing portion fixed to a leading end of the rubber gasket.

18. The dry-lubricating apparatus of claim 17, the leading portion extending farther than the leading end in direction away from the mating surface, when the dry-lubricating apparatus is slid onto the mating part.

19. A method for dry-lubricated press-fit assembly of a first part onto a second part, comprising:
pressing the first part onto the second part by sliding the first part along a mating surface of the second part such that, during said sliding, the mating surface abrades a dry lubricant off a lead-in edge of the first part so as to reduce friction between the mating surface and a rubber gasket, of the first part, trailing the lead-in edge.

20. The method of claim 19, the first part being a sleeve of a bearing seal, the second part being an axle.

21. The method of claim 19, the first part being a seal case of a bearing seal, the second part being a hub assembly.

22. The method of claim 19, further comprising disposing the lead-in edge on at least one of the rubber gasket and a frame of the first part.

23. The method of claim 22, the lead-in edge being a solid ring, the step of disposing comprising press fitting the solid ring onto at least one of the frame and the rubber gasket.

24. The method of claim 23, the step of press fitting comprising snapping a protruding ridge of the lead-in edge into an undercut in the rubber gasket.

25. The method of claim 22, the step of disposing comprising:
applying softened wax onto at least one of the frame and the rubber gasket; and
allowing the wax to harden to form the lead-in edge from the wax.

26. The method of claim 22, the step of disposing comprising disposing the lead-in edge on an inner-diameter leg of the frame where the inner-diameter leg connects to a radial leg of the frame, so as to form a dry-lubricating sleeve, for a bearing seal, configured to be press fit onto an axle.

27. The method of claim 22, the step of disposing comprising disposing the lead-in edge on an outer-diameter leg of the frame at a terminal end of the outer-diameter leg, so as to form a dry-lubricating seal case, for a bearing seal, configured to be press fit onto an hub assembly.

* * * * *